(12) United States Patent
Thomas et al.

(10) Patent No.: US 12,517,174 B1
(45) Date of Patent: Jan. 6, 2026

(54) SYSTEMS AND METHODS FOR MONITORING ELECTRICAL ISSUES

(71) Applicant: United Services Automobile Association (USAA), San Antonio, TX (US)

(72) Inventors: Anto Chirayil Thomas, Coppell, TX (US); Subhalakshmi Selvam, Allen, TX (US); Charlotte Thomas Creech, San Antonio, TX (US); Nathan Lee Post, Rockport, TX (US); Mathew Cyriac Kottoor, San Antonio, TX (US); Nina Cooper, San Antonio, TX (US); Reynaldo Medina, III, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 184 days.

(21) Appl. No.: 18/175,052

(22) Filed: Feb. 27, 2023

Related U.S. Application Data (60) Provisional application No. 63/314,741, filed on Feb. 28, 2022.

(51) Int. Cl.
*G01R 31/327* (2006.01)
*G06Q 30/0283* (2023.01)
*G06Q 50/06* (2012.01)
*H04Q 9/02* (2006.01)

(52) U.S. Cl.
CPC ....... *G01R 31/327* (2013.01); *G06Q 30/0284* (2013.01); *G06Q 50/06* (2013.01); *H04Q 9/02* (2013.01); *H04Q 2209/60* (2013.01)

(58) Field of Classification Search
CPC .. G01R 31/327; G06Q 30/0284; G06Q 50/06; H04Q 9/02; H04Q 2209/60
See application file for complete search history.

(56) References Cited

U.S. PATENT DOCUMENTS

| | | | | |
|---|---|---|---|---|
| 4,698,621 | A * | 10/1987 | Masot | G08B 21/185 340/638 |
| 4,706,073 | A * | 11/1987 | Vila Masot | H01H 71/04 337/206 |
| 2009/0206059 | A1 * | 8/2009 | Kiko | G05F 1/66 218/143 |
| 2012/0139472 | A1 * | 6/2012 | Ishibashi | H02J 3/14 320/136 |
| 2015/0248117 | A1 * | 9/2015 | Furuya | H02J 13/00034 361/622 |

(Continued)

*Primary Examiner* — Lee E Rodak
*Assistant Examiner* — Demetrius R Pretlow
(74) *Attorney, Agent, or Firm* — Fletcher Yoder, P.C.

(57) ABSTRACT

An electrical panel monitoring system may use sensors to acquire and transmit sensor data associated with an electrical panel. The electrical panel monitoring system may receive an expected value of an operating parameter for a device and compare it with the sensor data. The sensor data may include an actual value of the operating parameter for the device. The electrical panel monitoring system may detect an electrical issue and determine a time for the electrical issue based on a comparison between the actual value received from the sensor data and the expected value of the operating parameter. The electrical panel monitoring system may also recommend an operating time for the device.

20 Claims, 4 Drawing Sheets

(56) References Cited

U.S. PATENT DOCUMENTS

| | | | | |
|---|---|---|---|---|
| 2021/0035750 | A1* | 2/2021 | Miyamoto | G01R 19/10 |
| 2021/0048459 | A1* | 2/2021 | Micali | H04L 12/2823 |
| 2021/0109833 | A1* | 4/2021 | Petladwala | G06F 11/3409 |
| 2022/0216728 | A1* | 7/2022 | Ashman | H02J 13/00002 |
| 2023/0020449 | A1* | 1/2023 | Kang | G06Q 30/0211 |
| 2023/0231410 | A1* | 7/2023 | Nakada | H02J 13/00026 |
| | | | | 700/286 |

* cited by examiner

FIG. 4 ously from one implementation to another. Moreover, it should be appreciated that such a development effort might be complex and time consuming, but would nevertheless be a routine undertaking of design, fabrication, and manufacture for those of ordinary skill having the benefit of this disclosure.

SYSTEMS AND METHODS FOR MONITORING ELECTRICAL ISSUES

CROSS-REFERENCE TO RELATED APPLICATIONS

This application claims priority to and the benefit of U.S. Provisional Patent Application No. 63/314,741, filed Feb. 28, 2022, entitled "SYSTEMS AND METHODS FOR MONITORING ELECTRICAL ISSUES," the disclosure of which is incorporated by reference herein in its entirety for all purposes.

BACKGROUND

The present disclosure relates generally to systems and methods for continuously detecting and monitoring electrical issues. More specifically, the present disclosure generally relates to detecting and monitoring electrical issues at a panel-level or a breaker-level.

Electrical issues oftentimes result in unexpected expenses to insurance companies and their members. For example, refrigerated food spoilage is oftentimes covered under insurance policies when electricity is not provided to a refrigerator for an extended period of time. In many cases, insurance companies may have to rely on their members being truthful that this coverage should be paid out, as there aren't currently many ways to directly determine whether electricity was not provided to a device (e.g., refrigerator) for an extended period of time.

In addition, energy companies may have different rates for energy (e.g., electricity, gas) at different times of a day or different days in a week. For example, energy rates might be higher on the weekend than during weekdays due to relatively high demand and usage of energy on the weekend. More robust cost-saving data relating to usage of devices might help users save on energy usage as well as enabling energy companies to maintain a stable power system.

In addition, a user may have access to alternative power sources (e.g., solar energy, wind energy, and so forth). These alternative power sources may have different rates and availabilities at different times of a day, or different days in a week, or different months in a year, for example, based on specific locations. For example, solar energy rates may be cheaper than electricity rates in summer during the day time at certain locations. More robust cost-saving data relating to types of power usage of devices might help users save on energy usage, as well as enabling energy companies to maintain a stable power system.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include one or more sensors configured to detect sensor data associated with an electrical panel. The system may include an electrical panel monitoring system comprising a processor configured to receive an expected value of an operating parameter for a device receiving power from the electrical panel. The processor may receive the sensor data from the one or more sensors. The sensor data may include an actual value for the operating parameter of the device. The processor may identify an electrical issue based on a comparison between the actual value and the expected value for the operating parameter of the device. The processor may store a time for the electrical issue of the device in a storage medium.

In another embodiment, a method may include receiving an expected value for an operating parameter of a device receiving power from an electrical panel, receiving sensor data, which comprise an actual value for the operating parameter of the device, from one or more sensors, identifying an electrical issue of the device based on a comparison between the actual value and the expected value for the operating parameter of the device, and storing a time for the electrical issue of the device in a storage medium.

In another embodiment, a method may include receiving energy usage information for a property, determining a recommendation of an operating time for a device based on the energy usage information, receiving an operation time for the device, comparing the operation time for the device with the recommendation of the operating time for the device, and sending the recommendation of the operating time for the device to one or more devices.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As used herein, the terms "connect," "connection," "connected," "in connection with," and "connecting" are used to mean "in direct connection with" or "in connection with via one or more elements"; and the term "set" is used to mean "one element" or "more than one element." Further, the terms "couple," "coupling," "coupled," "coupled together," and "coupled with" are used to mean "directly coupled together" or "coupled together via one or more elements."

In addition, as used herein, the terms "real time", "real-time", or "substantially real time" may be used interchangeably and are intended to describe operations (e.g., computing operations) that are performed without any human-perceivable interruption between operations. For example, as used herein, data relating to the systems described herein may be collected, transmitted, and/or used in control computations in "substantially real time" such that data readings, data transfers, and/or data processing steps occur once every second, once every 0.1 second, once every 0.01 second, or even more frequent, during operations of the systems (e.g., while the systems are operating). In addition, as used herein, the terms "continuous", "continuously", or "continually" are intended to describe operations that are performed without any significant interruption. For example, as used herein, control commands may be transmitted to certain equipment every five minutes, every minute, every 30 seconds, every 15 seconds, every 10 seconds, every 5 seconds, or even more often, such that operating parameters of the equipment may be adjusted without any significant interruption to the closed-loop control of the equipment. In addition, as used herein, the terms "automatic", "automated", "autonomous", and so forth, are intended to describe operations that are performed are caused to be performed, for example, by a computing system (i.e., solely by the computing system, without human intervention). Indeed, although certain operations described herein may not be explicitly described as being performed continuously and/or automatically in substantially real time during operation of the computing system and/or equipment controlled by the computing system, it will be appreciated that these operations may, in fact, be performed continuously and/or automatically in substantially real time during operation of the computing system and/or equipment controlled by the computing system to improve the functionality of the computing system (e.g., by not requiring human intervention, thereby facilitating faster operational decision-making, as well as improving the accuracy of the operational decision-making by, for example, eliminating the potential for human error), as described in greater detail herein.

Systems and methods described herein may enable electrical issues to be detected and notifications of the electrical issues to be sent to devices. In addition, in certain embodiments, protective actions may be activated in response to receiving the notifications. However, it may be difficult for an insurance company to directly determine a proximate time and/or a proximate duration of electrical issues.

In certain embodiments, electrical issues may be detected at a panel-level or a breaker-level by using an electrical panel monitoring system that monitors each breaker at a panel. Each breaker may be assigned to particular circuits for certain devices (e.g., household devices, such as kitchen refrigerators, kitchen ovens, wine storages, washing machines, dryers, televisions (TVs), computers, Internet routers, and so forth). Using these assignments, it may be determined whether particular electrical issues, such as tripped breakers or power outages, have occurred as a panel-level or breaker-level issue.

In certain embodiments, sensors (e.g., electrical sensors, temperature sensors, motion sensors, sound sensors, image sensors, intelligent electronic devices, and so forth) may be installed and powered by the panel by a battery (e.g., rechargeable battery, either standing alone or connected to a power system, which may be charged when power is available), or by an additional power supply (e.g., power backup system, solar panel power system, and so forth), or any combination of them (e.g., converting to other power supply methods when there is an outage on one power supply). In certain embodiments, the sensors may monitor values of electrical operating parameters of the particular circuits, and send the sensor data to the electrical panel monitoring system.

In certain embodiments, the electrical panel monitoring system may receive expected values of the operating parameters from databases or other data resources (e.g., manufacturers). In certain embodiments, the electrical panel monitoring system may compare the expected values of the operating parameters with the values of the operating parameters that are detected by the sensors to determine whether an electrical issue has occurred. For example, if the values of the detected operating parameters deviate from the expected values of the parameters, an electrical issue may have occurred.

In certain embodiments, the electrical panel monitoring system may record the electrical issue with its time of occurrence and duration. In addition, in certain embodiments, an insurance company may determine insurance policy coverage based on the record of the electrical issue. In certain embodiments, the electrical panel monitoring system may send a notification of the electrical issue to devices and/or activate protective actions. In addition, in certain embodiments, the electrical panel monitoring system may monitor a particular device's operation time. In addition, in certain embodiments, the electrical panel monitoring system may receive energy rates (e.g., electricity or gas) with respect to time and date for a location, and determine whether a particular device is operating at a recommended time. By way of example, in certain embodiments, the electrical panel monitoring system may receive electricity rates from an electricity company of a user (e.g. an insurance customer) and may find that the electricity rates are lower at weekday/daytime than on weekend/evening. In addition, the electrical panel monitoring system may detect via the sensors that the user often uses a laundry system at weekend/evening times. In response, the electrical panel monitoring system may send recommendations of alternative operating times (e.g., daytime on a weekday) to the user. By operating certain devices at the recommended operating times, the electrical panel monitoring system may help save energy expenses for the user, may help to keep the power system stable, may reduce damages to the devices due to an unstable power system, and may help an insurance company to save costs on insurance policy and/or coverage.

In addition, in certain embodiments, the electrical panel monitoring system may receive other information related to power usage, such as weather forecasts (e.g., sunny, windy, raining, and so forth), social events, news, public welfare (such as a community lockdown due to a global pandemic may increase the power usage in certain individual's homes), and so forth. In certain embodiments, the electrical panel monitoring system may send recommendations of alternative power sources to the user based on the information received, as well as the electricity rates (or gas rates) available in a certain time period at a certain location. By way of example, the user may own or have access to a home solar electric system, or a wind farm, or other alternative sources of energy. The electrical panel monitoring system may monitor power usages of devices via the sensors on electrical panel, and may determine whether the alternative power sources available to the user (e.g., solar energy, wind energy, and so forth) can be used for certain device or devices so that the total energy expenses for the user may be reduced. For example, at a location with plenty of sunlight, the user may have access to solar energy (e.g., home solar energy system, solar leases, solarize programs, community or shared solar, or solar energy for purchase, and so forth) that is less expensive than electricity energy (or gas), and the electrical panel monitoring system may determine that certain devices (such as lights, fans, cooking devices, appliances, chargers for rechargeable devices, and so forth) may use solar energy rather than electricity energy (or gas) to reduce the user's total energy expenses. In addition, in certain embodiments, the electrical panel monitoring system may determine the recommendations based on the alternative power sources and the electricity energy (or gas) rates, potential energy access difficulties, potential negative effects (e.g., damage, reduction in expected lifetime, unstable operation, and so forth) to the devices or power systems, properties of the devices, operating time and/or operating period of the devices, and so forth. By operating certain devices using the recommended alternative power sources, the electrical panel monitoring system may help save energy expenses for the user, may help to keep the power system stable, may reduce damages to the devices due to an unstable power system, and may help an insurance company to save costs on insurance policy and/or coverage.

In certain embodiments, the electrical panel monitoring system may be coupled to another existing monitoring system of the property, or may be stand alone. In addition, in certain embodiments, the electrical panel monitoring system may be installed on a mobile device. In addition, in certain embodiments, the sensors may be portable sensors that may be relocatable with respect to the devices that are being monitored. In certain embodiments, the electrical panel monitoring system may be used to monitor the property for a period of time. As such, the electrical panel monitoring system may help both an insurance company and the user, may work on a demand, may be easily coupled to other existing systems, may be relatively portable, and so forth.

Figure 1:
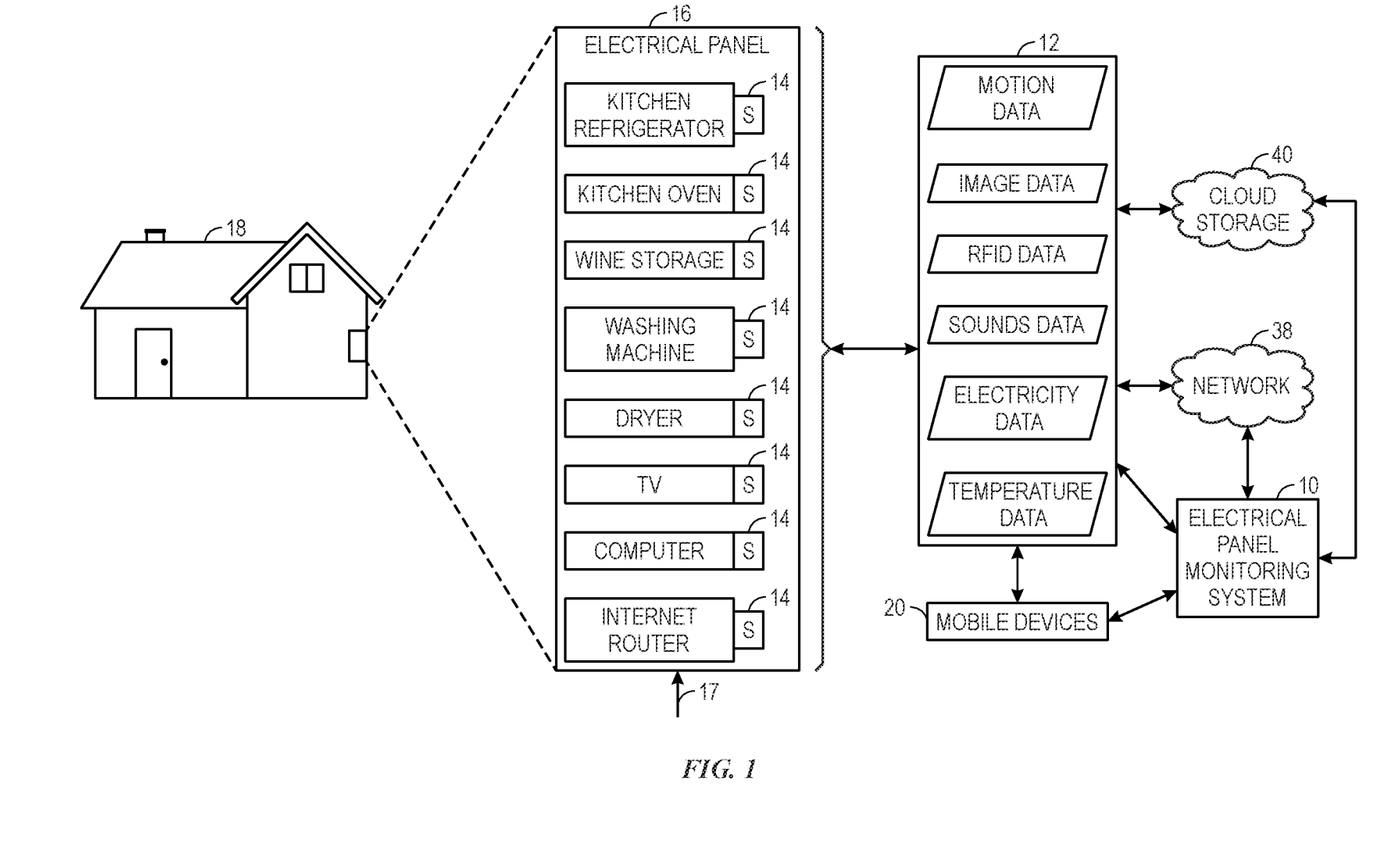
FIG. 1 illustrates a block diagram of a system communicatively coupled to a number of data sources, in accordance with embodiments described herein.

By way of introduction, FIG. 1 is a block diagram of a system that includes a number of data sources that may be employed by the embodiments described herein. For example, the system may include an electrical panel monitoring system 10 communicatively coupled to a variety of data sources that may assist the electrical panel monitoring system 10 to monitor electrical issues occurring for certain devices. Data from the variety of data sources may include insurance data (e.g., existing insurance coverage and premiums) related to the user, expected values of operating parameters for various devices (e.g., appliances, irrigation system), and sensor data 12. Sensor data 12 may be gathered from a variety of sensors 14 associated with (and, in certain embodiments, directly coupled to) an electrical panel 16 (e.g., directly coupled to particular breakers of the electrical panel 16 that are connected to circuits from which particular devices 17 receive power from the electrical panel 16), such as, electrical sensors, temperature sensors, motion sensors, sound sensors, image sensors, intelligent electronic devices, and the like.

The electrical panel 16 (e.g., distribution board) may have breakers assigned to particular circuits for devices 17 (e.g., household devices, such as kitchen refrigerators, kitchen ovens, wine storages, washing machines, dryers, televisions (TVs), computers, Internet routers, and so forth) associated with a property 18. In certain embodiments, a sound sensor 14, battery powered or charged by a power system (e.g., through a panel connection or by an additional power system), may detect an audible sound representative of when a particular breaker trips (e.g., when the sound sensor 14 is coupled to the electrical panel 16 directly adjacent a respective breaker of the electrical panel 16). Upon detecting the audible sound, the sound sensor 14 may send sensor data 12 (e.g., sound data) with a value of an operating parameter associated with the breaker indicating the breaker trip, which indicates a power outage for a device 17 associated with the particular circuits assigned to the breaker. Specifically, sensor data 12 may be transmitted to a database 36, through a network 38, or to cloud storage 40 either directly from the detecting sensors 14 or from mobile devices 20 (e.g., smart phones, laptops, and so forth) communicatively coupled to the detecting sensors 14.

As described in greater detail herein, the example sound sensor 14 is only one example of the types of sensors 14 that may be used to collect data relating to the electrical panel 16. For example, in certain embodiments, a motion sensor 14, battery powered or charged by a power system (e.g., through a panel connection or by an additional power system), may detect motion (e.g., of a breaker of the electrical panel 16 flipping) representative of when a particular breaker trips, which may indicate a power outage for a device 17 associated with the particular circuits assigned to the particular breaker. The motion sensor 14 may send sensor data 12 (e.g., motion data) with a value of an operating parameter associated with the breaker indicating the breaker trip.

In addition, in certain embodiments, an image sensor 14 (e.g., camera), battery powered or charged by a power system (e.g., through a panel connection or by an additional power system), may capture an image representative of when a particular breaker of the electrical panel 16 trips (e.g., flipped breaker), which may indicate a power outage for a device 17 associated with the particular circuits assigned to the particular breaker. The image sensor 14 may send sensor data 12 (e.g., image data) with a value of an operating parameter associated with the breaker indicating the breaker trip.

In addition, in certain embodiments, an RFID sensor 14, battery powered or charged by a power system (e.g., through a panel connection or by an additional power system), may detect a signal representative of when a particular breaker of the electrical panel 16 trips, which may indicate a power outage for a device 17 associated with the particular circuits assigned to the particular breaker. For example, in certain embodiments, an RFID tag may be attached to a portion of the particular breaker of the electrical panel 16, and signals from the RFID tag may indicate a position change of the particular breaker (e.g., flipped breaker). The RFID sensor 14 may send sensor data 12 (e.g., RFID data) with a value of an operating parameter associated with the breaker indicating the breaker trip.

In addition, in certain embodiments, an electrical sensor 14 or an intelligent electronic device 14, battery powered or charged by a power system (e.g., through a panel connection or by an additional power system), may directly detect an electrical signal with an electrical measurement (e.g., current or voltage) representative of when a particular breaker of the electrical panel 16 trips, which may indicate a power outage for a device 17 associated with the particular circuits assigned to the particular breaker. The electrical sensor 14 or the intelligent electronic device may send sensor data 12 (e.g., electricity data) with a value of an operating parameter associated with the breaker indicating the breaker trip.

In addition, in certain embodiments, a temperature sensor 14, battery powered or charged by a power system (e.g., through a panel connection or by an additional power system), may detect a temperature change (e.g., lower/higher than normal operating) representative of when a particular breaker of the electrical panel 16 trips, which may indicate a power outage for a device 17 associated with the particular circuits assigned to the particular breaker. The temperature sensor 14 may send sensor data 12 (e.g., temperature data) with a value of an operating parameter associated with the breaker indicating the breaker trip.

It will be appreciated that sensor data 12 from each of these types of sensors 14 may be correlated with each other by the electrical panel monitoring system 10 to determine when an electrical issue may have occurred for a particular device 17. As but on non-limiting example, even though a sound sensor 12 may have detected sound data indicative of a particular breaker of the electrical panel 16 tripping, an image sensor 12 may have captured an image that clearly shows that the particular breaker did not trip. As described in greater detail herein, the electrical panel monitoring system 10 may include machine learning algorithms that may be trained over time to correlate these different types of sensor data 12 to more accurately predict when electrical issues with certain devices 17 may be occurring by, for example, collecting historical sensor data 12 from each of the sensors 14 and correlating the historical sensor data 12 with actual reported occurrences of electrical issues with certain devices 17. As such, over time, the machine learning algorithms of the electrical panel monitoring system 10 may learn from the historical sensor data 12.

Figure 2:
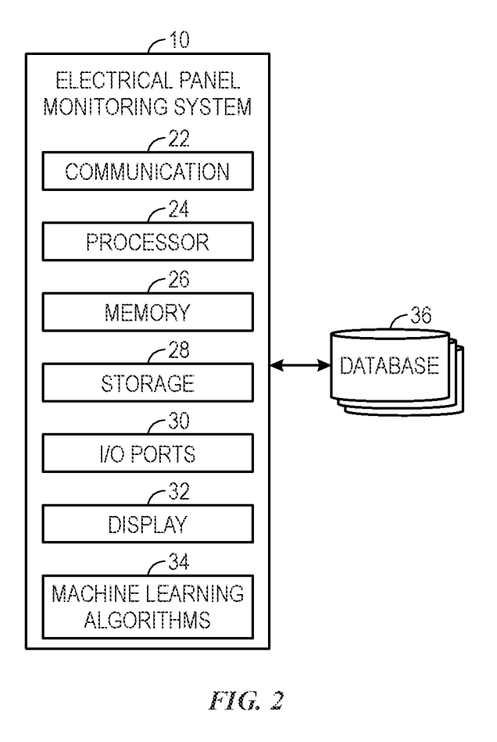
FIG. 2 illustrates a block diagram of an electrical panel monitoring system, in accordance with embodiments described herein.

As will be described in greater detail herein, the electrical panel monitoring system 10 may collect data from the various data sources (e.g., those depicted in FIG. 1) and perform various types of analysis to identify electrical issues for certain devices 17 that are electrically coupled to the electrical panel 16. By way of example, FIG. 2 is a block diagram of example components of the electrical panel monitoring system 10. In particular, in certain embodiments, the electrical panel monitoring system 10 may include various types of components that may assist the electrical panel monitoring system 10 in performing the various types of functions described herein. For example, in certain embodiments, the electrical panel monitoring system 10 may include a communication component 22, a processor 24, memory media 26, storage media 28, input/output (I/O) ports 30, a display 32, machine learning algorithms 34 that may be executed by the processor 24, and the like.

In certain embodiments, the communication component 22 may be a wireless or wired communication component that may facilitate communication between the electrical panel monitoring system 10 and various devices via a network, the Internet, or the like. For example, in certain embodiments, the communication component 22 may allow the electrical panel monitoring system 10 to obtain the data from the variety of data sources, such as databases 36 (e.g., insurance database, database for expected values of operating parameters), sensor data 12 (either directly from sensors 14 or through a mobile device 20), cloud storage 40, and the like. In certain embodiments, the communication component 22 may receive and send notifications to devices in the property 18 or mobile devices associated with the user. In addition, in certain embodiments, the communication component 22 may use a variety of communication protocols, such as Open Database Connectivity (ODBC), TCP/IP protocol, Distributed Relational Database Architecture (DRDA) protocol, Database Change protocol (DCP), HTTP protocol, other suitable current or future protocols, or combinations thereof.

The processor 24 may process instructions for execution within the electrical panel monitoring system 10. The processor 24 may include single-threaded processor(s), multi-threaded processor(s), or both. In certain embodiments, the processor 24 may process instructions stored in the memory media 26. The processor 24 may also include hardware-based processor(s), each including one or more cores. The processor 24 may include general purpose processor(s), special purpose processor(s), or both. The processor 24 may be communicatively coupled to other internal components of the electrical panel monitoring system 10 (such as the communication component 22, the storage media 28, the I/O ports 30, and the display 32).

The memory media 26 and the storage media 28 may be any suitable articles of manufacture that can serve as media to store processor-executable code, data, or the like. These articles of manufacture may represent computer-readable media (e.g., any suitable form of memory or storage) that may store the processor-executable code used by the processor 24 to perform the presently disclosed techniques. As used herein, applications may include any suitable computer software or program that may be installed onto the electrical panel monitoring system 10 and executed by the processor 24. The memory media 26 and the storage media 28 may represent non-transitory computer-readable media (e.g., any suitable form of memory or storage) that may store the processor-executable code used by the processor 24 to perform various techniques described herein. It should be noted that non-transitory merely indicates that the media is tangible and not a signal.

The I/O ports 30 may be interfaces that may couple to other peripheral components such as input devices (e.g., keyboard, mouse, and so forth), the sensors 14, input/output (I/O) modules, and the like. The display 32 may operate as a human machine interface (HMI) to depict visualizations associated with software or executable code being processed by the processor 24. In one embodiment, the display 32 may be a touch display capable of receiving inputs from an operator of the electrical panel monitoring system 10. The display 32 may be any suitable type of display, such as a liquid crystal display (LCD), plasma display, or an organic light emitting diode (OLED) display, for example. Additionally, in one embodiment, the display 32 may be provided in conjunction with a touch-sensitive mechanism (e.g., a touch screen) that may function as part of a control interface for the electrical panel monitoring system 10. It should be noted that the components described above with regard to the electrical panel monitoring system 10 are examples and the electrical panel monitoring system 10 may include additional or fewer components relative to the illustrated embodiment.

Referring back to the FIG. 1. In certain embodiments, the electrical panel monitoring system 10 may be communicatively coupled to a network 38, which may include collections of electrical panel monitoring systems, the Internet, an Intranet system, or the like. The network 38 may facilitate communication between the electrical panel monitoring system 10 and various other data sources. For example, the network 38 may be communicatively coupled to the sensors 14. In certain embodiments, the sensors 14 correspond to one or more sensors or devices associated with (and, in certain embodiments, directly coupled to) an electrical panel 16. In certain embodiments, the network 38 may also be communicatively coupled to databases 36, which may store data relating to the user and/or the property 18, such as insurance records, electrical issue records, historical sensor data, expected values of operating parameters, and other information that may be relevant for determining an electrical issue, an insurance policy and/or insurance coverage, and so forth. In certain embodiments, the network 38 may be communicatively coupled to cloud storage 40, which may store data relating to the user and/or the property 18 that may be relevant for determining an electrical issue, an insurance policy and/or insurance coverage, and so forth. In addition, in certain embodiments, the network 38 may further be communicatively coupled to mobile devices 20 associated with the user.

In certain embodiments, the sensors 14 may monitor each breaker assigned to particular circuits for devices 17 (e.g., household devices, such as kitchen refrigerators, kitchen ovens, wine storages, washing machines, dryers, televisions (TVs), computers, Internet routers, and so forth) at the electrical panel 16, such as electrical data (e.g., currents, voltages, impedances, and so forth), temperature data, motion data, humidity data, and the like. By way of example, in certain embodiments, the sensors 14 may be sensors directly measuring voltages for each breaker at the electrical panel 16. In certain embodiments, the electrical panel monitoring system 10 may receive expected values of operating parameters (e.g., voltages) for particular circuits from the mobile devices 20, the storage media 28, the database 36, the network 38, the cloud storage 40, or other sources. In certain embodiments, the electrical panel monitoring system 10 may use the communication component 22 to receive sensor data 12 generated by the sensors 14, and may store the sensor data 12 in the database 36 or the cloud storage 40, for example.

In certain embodiments, the sensor data 12 acquired by the sensors 14 may include values of actual operating parameters, and the sensor data 12 may be used by the electrical panel monitoring system 10 to determine an electrical issue by comparing actual values of the operating parameters with the expected values of the operating parameters. By way of an example, in certain embodiments, an expected value of voltage for a particular circuit may not be zero during a certain time, and a value of the voltage for the particular circuit in the sensor data 12 detected by the sensors 14 may be zero during the same time, which may indicate an electrical issue, such as power outage. In certain embodiments, the electrical panel monitoring system 10 may store the electrical issue information (e.g., time of occurrence, duration, and so forth), such as in the storage media 28, the database 36, and the like.

In certain embodiments, the electrical panel monitoring system 10 may send notifications of the electrical issue to certain devices (e.g., devices 17 in the property 18, the mobile devices 20, and so forth). In addition, in certain embodiments, the electrical panel monitoring system 10 may send instructions to activate protective actions (e.g., to activate power backup system). In certain embodiments, the electrical panel monitoring system 10 may continuously monitor the electrical issue and collect updated electrical issue information after the initial occurrence of the electrical issue. For example, the electrical panel monitoring system 10 may determine the duration of the electrical issue by comparing the updated electrical issue information with the corresponding electrical issue information stored in the storage. In addition, in certain embodiments, the electrical panel monitoring system 10 may determine an insurance policy and/or coverage based on the electrical issue information.

In addition, in certain embodiments, the electrical panel monitoring system 10 may detect an operating time of a particular item (e.g., dryer) based on sensor data 12 and compare it with a recommendation of operating times for a particular device 17 determined based on various data, such as energy rates, energy demands, or energy usages with respect to certain times and dates. In addition, in certain embodiments, the electrical panel monitoring system 10 may determine the recommendation of operating times for the particular device 17 based on cost-saving advice. By way of example, the electrical panel monitoring system 10 may recommend operation of the particular device 17 at daytime during weekdays instead of during evening time on weekends due to comparatively higher rates, demands, or usages of energy at evening time on weekends. Although the sensors 14 are described herein as being communicatively coupled to the electrical panel monitoring system 10 via the network 38, it should also be noted that, in other embodiments, the sensors 14 may be communicatively coupled directly to the electrical panel monitoring system 10.

In addition, in certain embodiments, the electrical panel monitoring system 10 may determine recommendations of alternative power sources for the particular device 17 based on cost-saving advice. By way of example, the electrical panel monitoring system 10 may recommend operation of the particular device 17 using solar energy instead of electricity energy during the daytime on a sunny day due to comparatively lower rates of solar energy relative to electricity energy, as well as the relative availability of solar energy. The electrical panel monitoring system 10 may determine the recommendations based on the alternative power sources and the electricity energy (or gas) rates, potential energy access difficulties, potential negative effects (e.g., damage, reduction in expected lifetime, unstable operation, and so forth) to the devices or power systems, properties of the devices, operating time and/or operating period of the devices, and so forth. In certain embodiments, the electrical panel monitoring system 10 may automatically adjust operation of the devices to use the recommended alternative power sources.

In certain embodiments, the sensor data 12 may be uploaded to the databases 36 or the cloud storage 40 for the electrical panel monitoring system 10 to analyze using mobile devices 20. In certain embodiments, one or more mobile devices 20 (e.g., smart phone) may be used to store the sensor data 12 and then upload the sensor data 12 to the databases 36 or the cloud storage 40. For example, the sensor data 12 may be transmitted from the sensors 14 to one or more mobile devices 20, and then the sensor data 12 may be uploaded to the cloud storage 40 by the one or more mobile devices 20. In certain embodiments, the sensor data 12 may be uploaded to the databases 36 or the cloud storage 40 after the electrical issue has occurred. For example, during a network outage, the sensor data 12 may be transmitted (e.g., through Bluetooth), and stored on certain mobile devices 20, and then uploaded to the databases 36 or the cloud storage 40 sometime later. In certain embodiments, the electrical panel monitoring system 10 may be installed on mobile devices 20, and the sensor data 12 may be transmitted to the storage media 28 of the mobile devices 20.

Figure 3:
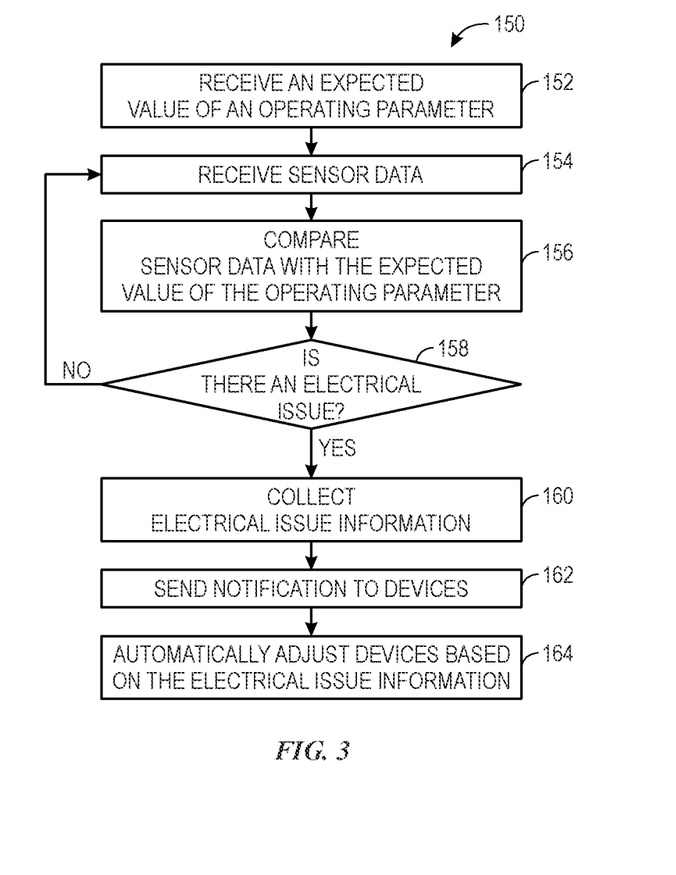
FIG. 3 illustrates a flow chart of a method for identifying an electrical issue based on data acquired from the data sources of FIG. 1, in accordance with embodiments described herein.

FIG. 3 illustrates a method 150 for detecting an electrical issue based on data acquired from the data sources described in greater detail herein. The electrical panel monitoring system 10 may perform operations described in greater detail herein via the processor 24 based on processor-executable code stored in the memory media 26 and/or the storage media 28. The processor 24 may execute the processor-executable code to receive the sensor data 12 and conduct analysis as described in greater detail herein. In certain embodiments, based on the monitoring and analysis, the electrical panel monitoring system 10 may determine an insurance policy and/or coverage for a user, send notifications or recommendations, activate protective actions, and the like. Although the example described in FIG. 3 is described in a particular order, it should be noted that the example method may be performed in any suitable order and is not limited to the order presented herein. It should also be noted that although each processing block is described below in the example method as being performed by the electrical panel monitoring system 10, other suitable electrical panel monitoring systems may perform the methods described herein.

Referring now to FIG. 3, at block 152, the electrical panel monitoring system 10 may receive expected values of operating parameters for particular circuits in the property 18 from the mobile devices 20, the storage media 28, the database 36, the network 38, the cloud storage 40, or other sources (e.g., manufacturers). For example, in certain embodiments, the electrical panel monitoring system 10 may search internet or intranet for expected operating parameters for particular circuits. In certain embodiments, the electrical panel monitoring system 10 may store the received expected values of operating parameters in the storage media 28, the database 36, the network 38, or the cloud storage 40.

At block 154, the electrical panel monitoring system 10 may use the communication component 22 to receive sensor data 12 generated by the sensors 14. The sensor data 12 may include values of actual operating parameters for a particular device 17. In certain embodiments, the sensors 14 may include electrical sensors, temperature sensors, motion sensors, sound sensors, image sensors, intelligent electronic devices, and the like. In certain embodiments, the sensors 14 may detect one or more operating parameters associated with one or more breakers on the electrical panel 16. In certain embodiments, the electrical panel 16 may have breakers assigned to particular circuits for devices 17 (e.g., household devices, such as kitchen refrigerators, kitchen ovens, wine storages, washing machines, dryers, televisions (TVs), computers, Internet routers, and so forth) in the property 18. By detecting operating parameters of the breakers, the electrical panel monitoring system 10 may detect the operating parameters of the devices 17.

By way of example, in certain embodiments, a voltage sensor, battery powered or charged by a power system (e.g., through panel connection or by additional power system), may detect a value of operating voltage associated with a breaker. By way of example, a value of zero of a voltage may indicate power outage for the particular circuit. In another example, certain values of a voltage may indicate a device operating in the particular circuit. By continuously receiving the sensor data 12, the electrical panel monitoring system 10 may continuously monitoring the operating parameters for particular circuits. In the current example, the voltage sensor may send sensor data 12 with the value of the operating voltage associated with the breaker, which indicates an operating voltage for a device 17 associated with the particular circuits assigned to the breaker. The value of the operating voltage may indicate the operation of the device 17, such as whether the device 17 is on or off. In certain embodiments, the electrical panel monitoring system 10 may record a time series of the value of the operating parameter.

After receiving sensor data 12 generated by the sensors 14, at block 156, the electrical panel monitoring system 10 may compare an actual value of an operating parameter in the sensor data 12 with respective expected values of the operating parameter received at block 152 above. In certain embodiments, the expected value of the operating parameter may be one or more single values, one or more ranges of values, or any combination thereof. In certain situations, the value of the operating parameter received from the sensors 14 may equal be to or in a range of the expected values such that the electrical panel monitoring system 10 may determine that the value of the operating parameter received from the sensors 14 is consistent with the expected values. Conversely, in other situations, the value of the operating parameter received from the sensors 14 may be substantially different from or outside of a range of expected values such that the electrical panel monitoring system 10 may determine that the value of the operating parameter received from the sensors 14 is not consistent with the expected values.

At block 158, the electrical panel monitoring system 10 may detect an electrical issue for a particular circuit by comparing actual values of the operating parameters included in the sensor data 12 with the expected values of the operating parameters received in block 152. In certain embodiments, the electrical panel monitoring system 10 may determine an electrical issue occurred when the values of the operating parameters deviate from the expected values (e.g., by a predetermined amount). When the actual value of the operating parameter received from the sensors 14 is consistent with the expected values, the electrical panel monitoring system 10 may determine that there is no electrical issue and may continue to continuously monitor the operating parameters using the sensors 14. Conversely, when the actual value of the operating parameter received from the sensors 14 is not consistent with the expected values, the electrical panel monitoring system 10 may determine that an electrical issue occurred. In certain embodiments, the electrical panel monitoring system 10 may determine the electrical issue occurred based on properties of a particular circuit. By way of an example, an expected value of voltage for a particular circuit may not be zero during a certain time, and a value of the voltage for the particular circuit in the sensor data 12 detected by the sensors 14 may be zero during the same time, which may indicate an electrical issue, such as a power outage. By continuously receiving the sensor data 12, the electrical panel monitoring system 10 may continuously monitor the operating parameters for the particular circuits and detect electrical issues.

After making the comparison, in certain situations, the electrical panel monitoring system 10 may determine that some of the sensor data 12 is not related to the electrical issue and, thus, refrain from evaluating the respective portion of the sensor data 12 for future analysis. On the other hand, if the sensor data 12 is related to the electrical issue, the electrical panel monitoring system 10 may utilize machine learning algorithms 34 or other identifying techniques to determine or identify correlations between the electrical issue and the sensor data 12. For example, the electrical issue and the sensor data 12 may be determined to be related to each other if the sensor data 12 consistently changes within a time period of the electrical issue. For instance, if some operating parameter of the sensor data 12 indicates that the power is out for a laundry system and the sensor data 12 consistently indicates (e.g., more than a threshold amount of time) that an irrigation system is operating, the electrical panel monitoring system 10 may determine that operating of the irrigation system is related to the power outage of the laundry system. In certain embodiments, the electrical panel monitoring system 10 may send notifications to indicate the relationship between operating the irrigation system and the power outage of the laundry system, and system repair or adjustment may be implemented based on the notifications. As such, conflicts or interferences in systems controlled by the electrical panel 16 may be discovered and treated accordingly.

After detecting an electrical issue, the electrical panel monitoring system 10 may collect information of the electrical issue at block 160, such as time of occurrence, duration, and the like. In certain embodiments, the electrical panel monitoring system 10 may store the electrical issue information (e.g., time of occurrence, duration), such as in the storage media 28, the database 36, and the like. In certain embodiments, the electrical panel monitoring system 10 may continuously monitor the electrical issue and collect updated electrical issue information. For example, the electrical panel monitoring system 10 may determine the duration of the electrical issue by comparing the updated electrical issue information with the corresponding electrical issue information stored in the storage.

In addition, in certain embodiments, the electrical panel monitoring system 10 may send notifications of the electrical issue to devices (e.g., devices 17 in the property 18, the mobile devices 20, and so forth) at block 162. As described above, the notifications may include electrical issue information (e.g., time of occurrence, duration), system conflicts, and the like.

At block 164, the electrical panel monitoring system 10 may send instructions to automatically activate protective actions (e.g., activate backup system or alternative power sources) or automatically adjust devices 17 (e.g., turn off devices 17 when values of operating parameters from the sensor data 12 are higher than expected values) based on the electrical issue information. In addition, in certain embodiments, the electrical panel monitoring system 10 may determine an insurance policy and/or coverage based on the electrical issue information.

Figure 4:
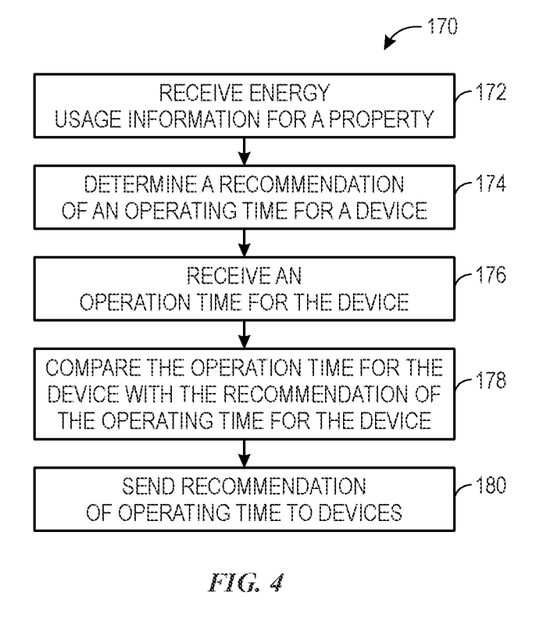
FIG. 4 illustrates a flow chart of a method for recommending an operating time for a device based on data acquired from the data sources of FIG. 1, in accordance with embodiments described herein.

FIG. 4 illustrates a method 170 for recommending an operating time for a device 17 for the purpose of cost-saving, keeping a power system stable, lowering insurance coverage, and the like. The electrical panel monitoring system 10 may perform operations described below via the processor 24 based on processor-executable code stored in the memory media 26 and the storage media 28. The processor 24 may execute the processor-executable code to receive the sensor data 12 and conduct analysis as described below. Based on the monitoring and analysis, the electrical panel monitoring system 10 may recommend an operating time for a device 17, automatically adjust operating parameters of devices 17 (e.g., schedule operations of the devices 17), and the like.

Although the example described in FIG. 4 is described in a particular order, it should be noted that the example method may be performed in any suitable order and is not limited to the order presented herein. It should also be noted that although each processing block is described below in the example method as being performed by the electrical panel monitoring system 10, other suitable electrical panel monitoring systems may perform the methods described herein.

Referring now to FIG. 4, at block 172, the electrical panel monitoring system 10 may receive energy usage information for a particular location (e.g. at the property 18), such as rates, demands, or usages in different times (e.g., weekdays, weekends, daytime, evening time). The electrical panel monitoring system 10 may receive energy usage information from mobile devices 20, the storage media 28, the database 36, the network 38, the cloud storage 40, or other sources (e.g., internet, or energy companies). In certain embodiments, the electrical panel monitoring system 10 may utilize the energy usage information to recommend operating a particular device 17 at daytime during weekdays instead of evening time on weekends due to higher rates, demands, or usages of energy at evening time on weekends. In certain embodiments, the electrical panel monitoring system 10 may receive other information to help to determine the recommendation of an operating time for the particular device 17, such as weather information, social events, and the like. By way of an example, the electrical panel monitoring system 10 may receive weather information indicating a severe thunderstorm coming to the particular location, which may cause power outages. In certain embodiments, the electrical panel monitoring system 10 may utilize the weather information received to recommend not to operate a particular device 17 at a time where the severe thunderstorm is likely. By way of an example, the electrical panel monitoring system 10 may recommend not to operate an irrigation system during a possible severe thunderstorm in the particular location. Similar methods may be used for recommending an alternative power source/sources for a device 17 for the purpose of cost-saving, keeping a power system stable, lowering insurance coverage, and so forth.

As described in greater detail herein, the electrical panel monitoring system 10 may determine recommendations of the operating time for the particular device 17 at block 174. In certain embodiments, the electrical panel monitoring system 10 may utilize machine learning algorithms 34 or other identifying techniques to determine recommendations of the operating time for the device 17. In certain embodiments, the machine learning algorithms 34 may identify relevant correlations between energy usage information, other information (e.g., weather information), and an operating time for the device 17 by searching for location-specific energy usage information (e.g., at the property 18), sensor data types (e.g., motion sensor data, voltage data), corresponding device properties, or related information recorded in a database 36 based on historical correlations. In certain embodiments, the machine learning algorithms may update the identified correlations in a database 36. In particular, the machine learning algorithms may be trained based on newly acquired sensor data 12 that is received by the electrical panel monitoring system 10.

At block 176, the electrical panel monitoring system 10 may receive actual operation times for a particular device 17 from the storage media 28, database 36, cloud storage 40, and the like. As described above in FIG. 3, the electrical panel monitoring system 10 may record a time series of the values of the operating parameters for the particular device 17 and determine the operation times of the device 17 based on the values of the operating parameters and/or other properties of the device 17.

At block 178, after receiving actual operation times for the device 17, the electrical panel monitoring system 10 may compare the actual operation times with respective recommendations of the operating times determined in block 174 above. The recommendations of the operating times may be one or more single values, one or more ranges of values, or any combination thereof. In certain situations, the actual operation times may equal to or in range of the recommendations of the operating times, and the electrical panel monitoring system 10 may determine that the actual operation times are consistent with the recommendations of the operating times. Conversely, in other situations, the actual operation times may be different from or out of a range of the recommendations of the operating times, and the electrical panel monitoring system 10 may determine that the actual operation times are not consistent with the recommendations of the operating times.

At block 180, the electrical panel monitoring system 10 may send notifications to devices after the electrical panel monitoring system 10 determines whether the actual operating times are or are not consistent with the recommendations of the operating times. In addition, in certain embodiments, the electrical panel monitoring system 10 may send instructions to automatically schedule (e.g., through a home devices control application) the operating times of the device 17 to be consistent with the recommendations of the operating times. In addition, in certain embodiments, the electrical panel monitoring system 10 may send instructions to automatically adjust (e.g., by controlling the breakers on the electrical panel 16) the operating times of the device 17 to be consistent with the recommendations of the operating times.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
   one or more sensors configured to detect sensor data associated with an electrical panel, wherein the sensor data comprises a first set of sensor data and a second set of sensor data, and wherein the first set of sensor data and the second set of sensor data are different types of sensor data; and
   an electrical panel monitoring system, comprising a processor configured to:
   receive an expected value for an operating parameter of a device receiving power from the electrical panel;
   receive the first set of sensor data from the one or more sensors, wherein the first set of sensor data comprises an actual value for the operating parameter of the device;
   identify an electrical issue of the device based on a comparison between the actual value and the expected value for the operating parameter of the device;
   in response to identifying the electrical issue, receive the second set of sensor data from the one or more sensors, wherein the second set of sensor data is associated with an operating condition of the device;
   in response to the second set of sensor data being indicative of the electrical issue to confirm the electrical issue, store a time for the electrical issue of the device in a storage medium; and
   automatically adjust one or more operating parameters of one or more devices in response to confirming the electrical issue.

2. The system of claim 1, wherein the one or more sensors comprise a sound sensor configured to detect an audible sound indicating a breaker trip on the electrical panel.

3. The system of claim 1, wherein the one or more sensors are directly coupled to the electrical panel.

4. The system of claim 1, wherein the device is a kitchen refrigerator, a kitchen oven, a wine storage, a washing machine, a dryer, a television, a computer, or an Internet router.

5. The system of claim 1, wherein the processor is configured to identify the electrical issue based at least in part on one or more properties associated with the device.

6. The system of claim 1, wherein the processor is configured to continuously receive the sensor data after an initial occurrence of the electrical issue, and to continuously update the time for the electrical issue of the device after the initial occurrence of the electrical issue.

7. The system of claim 1, wherein the processor is configured to send a notification of the electrical issue to one or more devices.

8. The system of claim 1, wherein the processor is configured to receive the sensor data from a mobile device associated with the one or more sensors.

9. The system of claim 1, wherein the processor is configured to receive the sensor data directly from the one or more sensors.

10. A method comprising:
    receiving an expected value for an operating parameter of a device receiving power from an electrical panel, wherein one or more sensors are configured to detect sensor data associated with the electrical panel, wherein the sensor data comprises a first set of sensor data and a second set of sensor data, and wherein the first set of sensor data and the second set of sensor data are different types of sensor data;
    receiving the first set of sensor data from the one or more sensors, wherein the first set of sensor data comprises an actual value for the operating parameter of the device;
    identifying an electrical issue of the device based on a comparison between the actual value and the expected value for the operating parameter of the device;
    in response to identifying the electrical issue, receiving the second set of sensor data from the one or more sensors, wherein the second set of sensor data is associated with an operating condition of the device;

in response to the second set of sensor data being indicative of the electrical issue to confirm the electrical issue, storing a time for the electrical issue of the device in a storage medium; and automatically adjusting one or more operating parameters of one or more devices in response to confirming the electrical issue.

11. The method of claim 10, wherein the one or more sensors comprise a sound sensor configured to detect an audible sound indicating a breaker trip on the electrical panel.

12. The method of claim 10, wherein the one or more sensors are directly coupled to the electrical panel.

13. The method of claim 10, wherein the device is a kitchen refrigerator, a kitchen oven, a wine storage, a washing machine, a dryer, a television, a computer, or an Internet router.

14. The method of claim 10, comprising identifying the electrical issue based at least in part on one or more properties of the device.

15. The method of claim 10, comprising:

continuously receiving the sensor data after an initial occurrence of the electrical issue; and continuously updating the time for the electrical issue of the device after the initial occurrence of the electrical issue.

16. The method of claim 10, comprising sending a notification of the electrical issue to one or more devices.

17. The system of claim 1, wherein the second set of sensor data is motion data.

18. The system of claim 1, wherein the second set of sensor data is image data.

19. The system of claim 1, wherein the second set of sensor data is sound data.

20. The system of claim 1, wherein the second set of sensor data is electricity data.

* * * * *